United States Patent [19]

Iwasaki

[11] 4,357,114

[45] Nov. 2, 1982

[54] TEMPERATURE SENSOR

[75] Inventor: Shinichiro Iwasaki, Auburn Heights, Mich.

[73] Assignee: Aisin Seiki Company, Limited, Kariya, Japan

[21] Appl. No.: 182,813

[22] Filed: Aug. 29, 1980

[51] Int. Cl.³ ............................................. G01K 7/38
[52] U.S. Cl. ..................................... 374/176; 374/170
[58] Field of Search .............. 73/362 R, 362 CP, 350; 324/201; 323/362

[56] References Cited

U.S. PATENT DOCUMENTS 2,756,595 7/1956 Rathenau et al. ................. 73/339 R
4,085,617 4/1978 Langberg ....................... 73/362 CP

OTHER PUBLICATIONS

"Force and Displacement Transducers . . . " By Mohri et al. from "Electrical Engineering in Japan" Vol. 99C, No. 1, pp. 205–212, Feb. 1979.

Primary Examiner—James J. Gill
Attorney, Agent, or Firm—Oblon, Fisher, Spivak, McClelland & Maier

[57] ABSTRACT

A temperature sensor includes a permanent magnet placed on an object whose temperature is to be measured, a magnetically soft member located within the magnetic field of the magnet and an electrical coil placed around the magnetically soft member. The electrical coil is supplied with voltage pulses at one end while the other end is connected to a resistor in series to detect a voltage drop. The time lag of the voltage drop with respect to the voltage pulse is represented by an analog voltage or a digital code. A change in temperature changes the field strength of the magnet and hence the flux in the magnetically soft member. The coil senses the change in flux as a change in the time lag and thus measures the temperature.

3 Claims, 9 Drawing Figures

TEMPERATURE SENSOR

BACKGROUND OF THE INVENTION

1. Field of the Invention

This invention relates to a temperature sensor and more particularly to a temperature sensor of the type which translates a change of magnetic field strength of a magnet caused by a temperature change into an electrical signal.

2. Description of the Prior Art

Prior art temperature sensors include thermistors in which a resistance changes in response to a temperature change. The disadvantages of such devices are that the stability and the exchangeability are poor, the control of the material components and the thermal conditions is difficult, the linearity of the electrical signal is hard to obtain, and the sensor is subject to failure upon impact.

SUMMARY OF THE INVENTION

Accordingly, one object of this invention is to provide a novel temperature sensor having a high resistance to oscillation and shock.

It is a second object of this invention to provide a temperature sensor which requires a relatively simple processing of a temperature detection signal.

It is a third object of this invention to provide a temperature sensor capable of providing a temperature data read-out using relatively simple read logic in the form of a large scale integrated circuit, such as a microcomputer.

In accordance with the invention, the temperature sensor comprises a permanent magnet disposed in a casing near the object whose temperature is being measured and a magnetically soft member surrounded by an electrical coil and disposed near the permanent magnet. The magnetically soft member has a transverse cross section of reduced magnitude so that magnetic saturation is easily achieved. The electrical coil has an increased number of turns so that the magnetically soft member can be magnetically saturated with a relatively low applied voltage or at a relatively low current level. The permanent magnet is physically reduced while being strong enough to provide a magnetic field of the necessary magnitude to the magnetically soft member.

The time, T required for the magnetically soft member to saturate from the instant of application of a voltage to a coil disposed about the member can be expressed approximately as follows:

$$T = (N/E)(\phi_m - \phi_x) \quad (1)$$

where E represents the voltage applied, N is the number of turns in the coil, $\phi_m$ is the maximum flux which is approximately equal to the saturation flux and $\phi_x$ is the flux attributable to an external magnetic field. As the magnitude of $\phi_x$ which is applied to the magnetically soft member changes in response to a temperature change of the permanent magnet, the value of T also changes. In this manner, as the temperature of the permanent magnet varies to cause a change in the external flux $\phi_x$ applied to the magnetically soft member, the length of time, T, from the application of a voltage to the coil until the coil current reaches a given level changes. Accordingly, in the temperature sensor of the invention, an electrical circuit or a semiconductor electronic device is provided which determines the value of T and provides an electrical signal in the form of a voltage level or a digital code indicative of such value. In a preferred embodiment of the invention, an amorphous magnetic material is used to form the magnetically soft member. Since an amorphous magnetic member must be manufactured by quenching from a liquid phase metal, it is formed as a thin sheet. It exhibits ferromagnetism and has a high level of magnetic saturation, high permeability ($\mu_{max} > 10^3$), and a low level of coercive force ($< 1.0$ Oe) while exhibiting a very high break strength and an excellent resiliency and stability. Some magnetically soft materials are described in Hasegawa et al., "Soft Magnetic Properties of Metallic Glasses—Recent Developments," J. Appl. Phys. 50(3), March, 1979, pp. 1551-1556. Magnetically soft materials are sold under the trademark METGLAS® by Allied Chemical Corp. Such properties of an amorphous material are preferred for use in the temperature sensor of this invention. Its use advantageously facilitates signal processing and increases the accuracy in the determination of the value of T. In addition, the manufacture of the device is less complex while its resistance to oscillation or shock is improved.

BRIEF DESCRIPTION OF THE DRAWINGS

A more complete appreciation of the invention and many of the attendant advantages therof will be readily obtained as the same becomes better understood by reference to the following detailed description when considered in connection with the accompanying drawings, wherein:

FIG. 2b is a graph showing the waveforms of input and output signals of the processing circuit shown in FIG. 2a;

FIG. 3b is a graph showing the waveforms of input and output signals of the processing circuit shown in FIG. 3a;

FIG. 6b is a graph showing data obtained by the test of the arrangement of FIG. 6a.

DETAILED DESCRIPTION OF THE PREFERRED EMBODIMENTS

Figure 1:
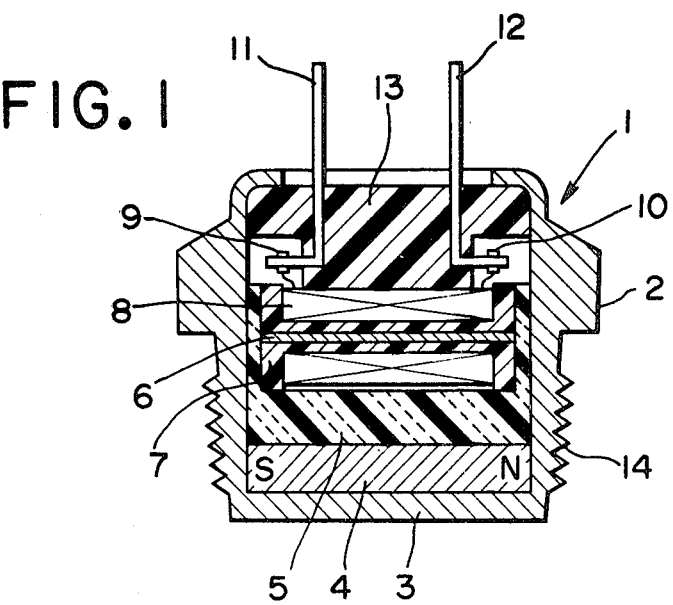
FIG. 1 is a longitudinal cross-sectional view of a temperature sensor according to one embodiment of the invention.

Referring now to the drawings, wherein like reference numerals designate identical or corresponding parts throughout the several views, and more particularly to FIG. 1 thereof, a temperature sensor 1 includes a casing 2 made of brass having a high thermal conductivity and mounted on a suitable stationary part of an object whose temperature is to be measured at a screw-threaded portion 14. A permanent magnet 4 is fixedly carried on a lower portion 3 of the casing 2. A magnetically soft amorphous member 6 is disposed in parallel relationship with the magnet 4 through an insulating material such as a ceramic 5 having a channel shaped cross-section. The magnetically soft member passes through a bobbin 7 which has an electrical coil 8 wound thereon, with the ends of the coil 8 being connected to lead wires 11 and 12 via terminals 9 and 10, respectively. The numeral 13 denotes a plastic plug.

When the permanent magnet 4 is subjected to heat, the magnetic field strength of the permanent magnet 4 varies in response to the temperature change. As a result the flux within magnetically soft member 6 also changes. Such a temperature change in the permanent magnet 4 is detected by determining the flux change in the magnetically soft member using an electrical processing circuit or electronic processing unit.

Figure 2A:
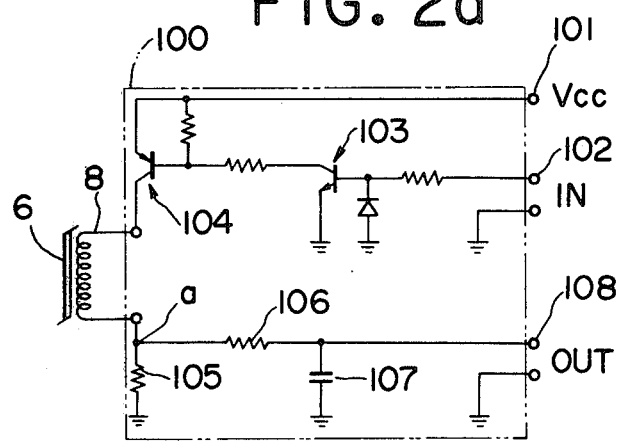
FIG. 2a is a circuit diagram of an electrical processing circuit connected to the temperature sensor shown in FIG. 1 for producing an analog voltage which corresponds to the temperature detected.
Figure 2B:
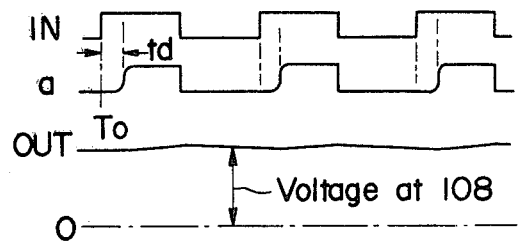

FIG. 2a shows one form of electrical processing circuit 100. The circuit 100 includes a terminal 101 adapted to be connected with a given d.c. voltage, on the order of +5 V, for example. The circuit also includes an input terminal 102, to which voltage pulses having a frequency on the order of 5–25 KHz, for example, are applied. An NPN transistor 103 which has its base connected to the terminal 102 is rendered conductive during the time the voltage pulses remain positive, and is rendered non-conductive when the voltage pulses assume a ground level. A PNP transistor 104 is turned on and off when the transistor 103 is turned on and off, respectively. Hence, the supply voltage (Vcc) is applied to the electrical coil 8 during the time the voltage pulses applied to the input terminal 102 remain positive, while no voltage is applied thereto during the time that the voltage pulses remain at ground level. A voltage proportional to the current flow through the coil 8 is developed across a resistor 105, and is integrated by an integrator formed by a resistor 106 and a capacitor 107, with the integrated voltage appearing at an output terminal 108. FIG. 2b graphically shows the waveform of the input and the output voltages of the circuit shown in FIG. 2a. The time lag $t_d$, starting at the rising end of the input voltage (IN) and ending when the voltage across the resistor 105 exceeds a given level, as well as the integrated voltage Vx, which represents an integral of the voltage across the resistor 105, depend on the temperature of the permanent magnet 4.

Figure 3A:
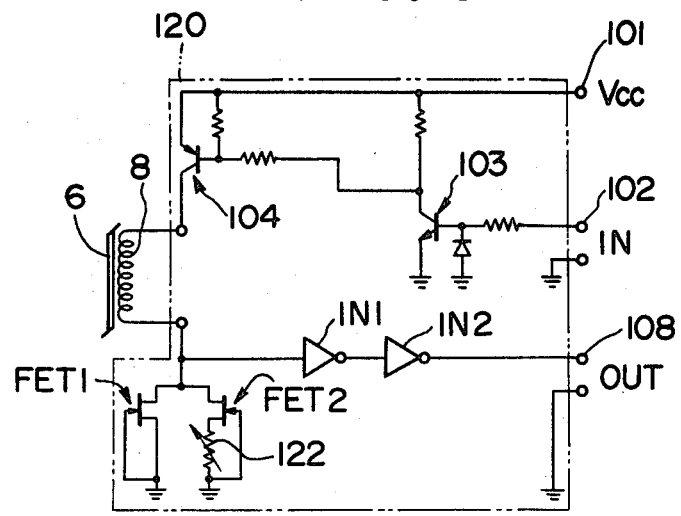
FIG. 3a is a circuit diagram of another electrical processing circuit connected to the temperature sensor shown in FIG. 1 for deriving a pulse indicative of a time lag corresponding to the temperature detected.

FIG. 3a illustrates another electrical processing circuit 120. In this instance, NPN transistor 103 and PNP transistor 104 are turned on during the time when the input voltage (IN) remains positive, thus allowing the application of voltage to the coil 8. During the time the input voltage (IN) assumes the ground level, the transistor 103 and the PNP transistor 104 are turned off. A pair of junction N-channel field effect transistors FET 1 and FET 2 together form a constant current source which maintains a constant current flow through the coil. The current level through FET 2 can be adjusted by means of a variable resistor 122. The voltage developed at the terminal of the coil which is connected to FET 1 and FET 2 is fed to a pair of cascade connected inverting amplifiers IN 1 and IN 2, which amplify and shape it.

Figure 3B:

FIG. 3b graphically shows the waveform of the input and output voltages of the circuit of FIG. 3a. The circuit 102 produces an output (OUT) of voltage pulses which are delayed by a time lag $t_d$ with respect to an input pulse (IN), where the magnitude of the time lag depends on the temperature of the permanent magnet 4.

Figure 4:
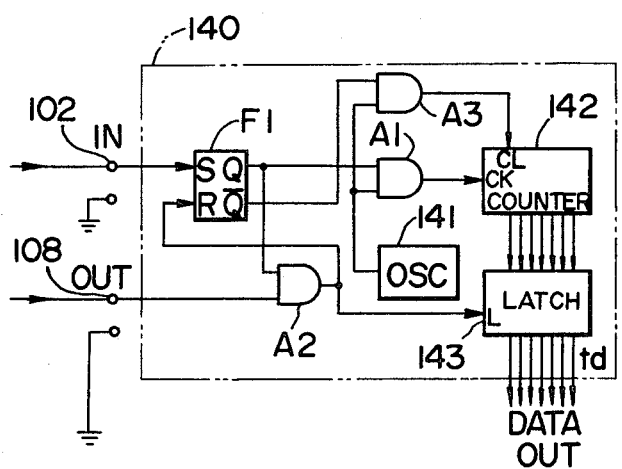
FIG. 4 is a block diagram of a counter circuit which converts a time lag between an input and an output pulse from the processing circuit of FIG. 3a into a digital code.

FIG. 4 shows a counter circuit 140 which converts the magnitude of $t_d$ into a corresponding digital code. In the circuit of FIG. 4, the rising end of an input voltage (IN) sets a flipflop F1, whereby its Q output changes to a high level or "1," which enables an AND gate A1 to pass a pulse produced by a clock pulse oscillator 141 to a count pulse input CK of a counter 142. An output pulse (OUT) and the Q output of the flipflop F1 are applied to an AND gate A2, which produces a high level or "1" when the output pulse (OUT) rises to a high level. At this point in time, the flipflop F1 is reset, with its Q output reverting to a low level or "0." This disables the AND gate A1, and hence the supply of clock pulses to the counter 142 is interrupted. At the time when the AND gate A2 produces a "1" output, a code indicative of the count in the counter 142 is stored in a latch 143.

After the flipflop F1 is reset and the latch 143 has been loaded with the count code, an AND gate A3 passes a clock pulse to clear the counter 142. An output code from the latch 143 indicates the number of clock pulses passed during the time interval $t_d$, and hence represents the magnitude of $t_d$.

Figure 5:
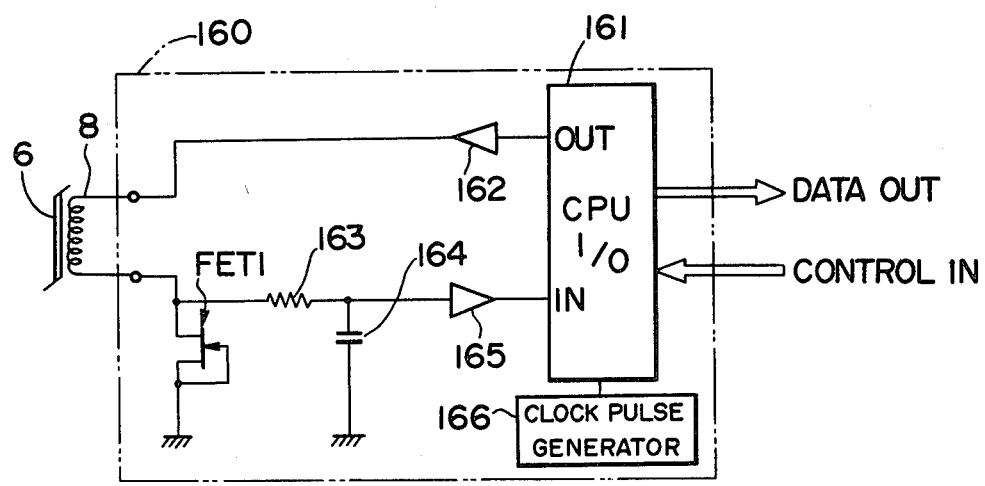
FIG. 5 is a block diagram of an electronic processing unit connected to the temperature sensor shown in FIG. 1 for determining the time lag of the current flow through an electrical coil of the temperature sensor in response to voltage pulses applied thereto from a single chip microcomputer.

An electronic processing unit 160 shown in FIG. 5 comprises a single chip microcomputer (a large scale integrated semiconductor unit) 161, an amplifier 162, a junction N-channel field effect transistor FET 1 which acts as a constant current source, a resistor 163, a capacitor 164, an amplifier 165 and a clock pulse generator 166. The combination of the resistor 163 and the capacitor 164 forms a filter which removes voltage oscillations of frequencies higher than the frequency of the input and the output pulses. The microcomputer 161 forms pulses of a given frequency in a range from 5 to 30 KHz in response to the clock pulses, and feeds them to the amplifier 162. At the same time, the microcomputer 161 monitors the voltage developed at the junction between the N-channel FET 1 and one end of the coil, through the output voltage of the amplifier 165, and counts the clock pulses which are developed during the time starting with the rising end of the pulse outputted by itself and ending when the output voltage of the amplifier 165 rises to a given level. Such a time interval corresponds to $t_d$, and the microcomputer forms an output code indicative of the value of $t_d$ (DATA OUT).

As discussed above, the temperature sensor 1 of FIG. 1 may be connected to a variety of electrical processing circuits or electronic logical processing units to provide an electrical signal indicative of the temperature change of the permanent magnet 4 within the temperature sensor 1.

Figure 6A:
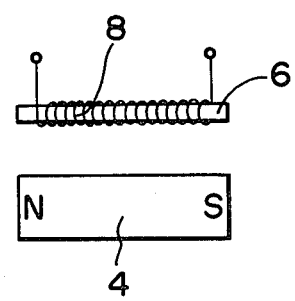
FIG. 6a is a front view of the arrangement of the magnetically soft member and the ferrite magnet in a test for determining the flux change in the magnetically soft member due to a temperature change in the magnet.
Figure 6B:
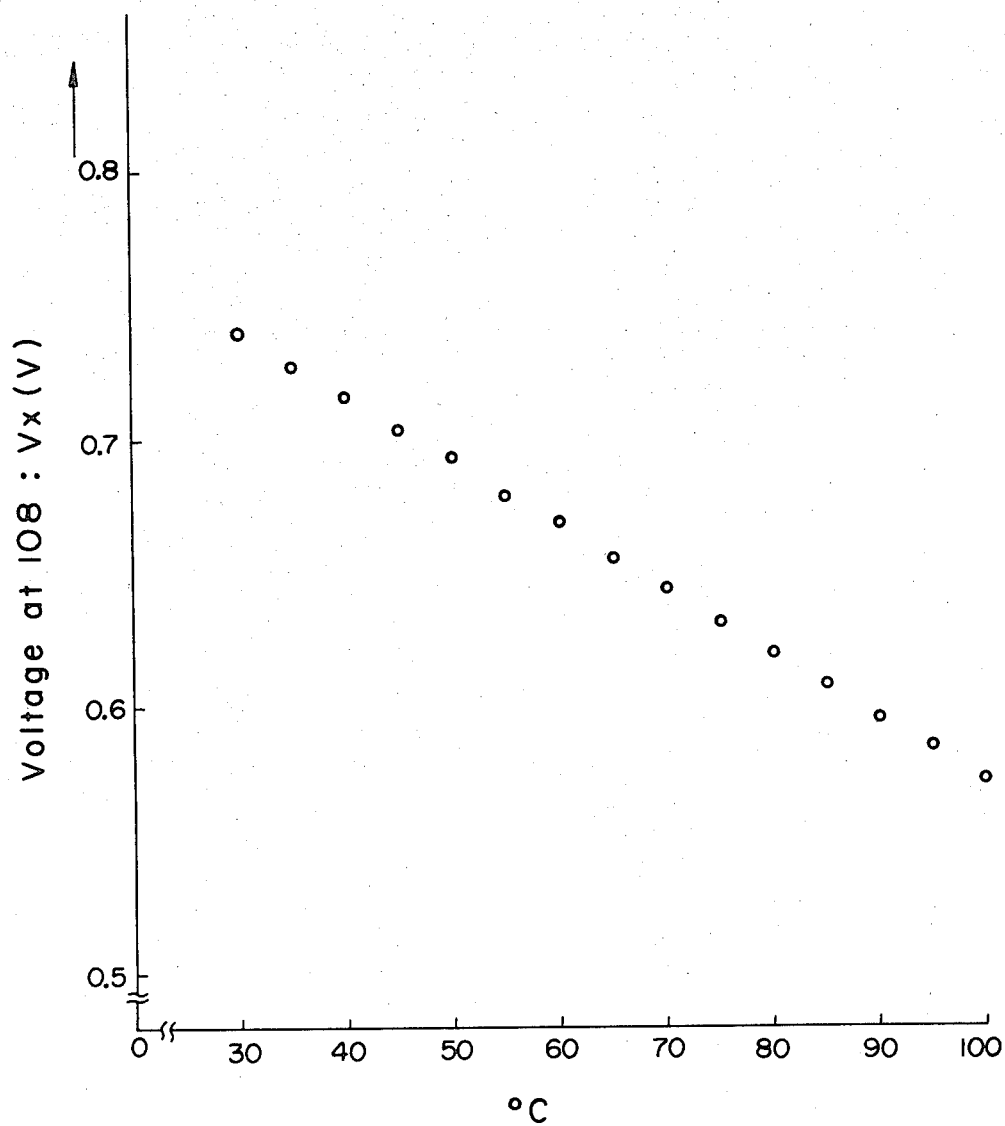

With references to FIGS. 6a and 6b, the flux change is tested by arranging a ferrite magnet 4 of temperature coefficient of −0.2%/°C. in parallel to the magnetically soft material 6 and separated from it by an air gap. The ferrite magnet 4 is first heated with hot air and then allowed to stand so as to detect the flux change of the magnet during cooling by an amorphous sensor displaced within the electrical coil.

The specific values of various parameters, and the material of the magnetically soft member are indicated as follows:

In the magnetically soft member 6, material and atomic weight percent: Fe 40, Ni 40, P 14, and B 6

| thickness: | 0.058mm |
|---|---|
| width: | 1.8mm |
| length: | 40mm |
| number of sheets: | 4 |

In the electrical coil 8,
number of turns: 1000 (diameter 0.12 mm)
In the ferrite magnet 4,

| diameter: | 12mm |
|---|---|
| length: | 40mm |

Gap between the magnet 4 and the magnetically soft member: 10 mm
Measuring means and frequency of input pulses: Circuit 100, 5 KHz
Mode of voltage polarity: N—N (The connection of a coil 8 with the electrical circuit 100 is such that an N-pole is produced at the left end of the magnetically soft member 6 in FIG. 6a.)

It is seen from the graph shown in FIG. 6b that an increase in the temperature of the ferrite magnet 4 decreases its magnetic field strength. The output voltage Vx is linearly and gradually decreased in response to the increase in the temperature of the magnet, thereby realizing a linear relationship in a considerably wide range of temperatures.

As will be apparent from the foregoing description, the change in magnetic characteristic in response to a thermal input is converted into an electrical signal by a simple construction, so that the device achieves a temperature detection in a simple manner. What is more important, the arrangement of the electrical processing circuit connected to the sensor is simple. In particular, a large scale semiconductor unit such as a single chip microcomputer may be used to produce a detection pulse and to derive a time lag between the detection pulse and a current pulse through the electrical coil.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A temperature sensor comprising:
   a casing having first and second portions;
   said first portion of said casing being exposed to an object at a temperature which is to be sensed;
   a permanent magnet having magnetic field strength which changes in response to a temperature change, said magnet disposed within said first portion for sensing the temperature of the object;
   a core of magnetically soft material disposed within said second portion;
   an electrical coil disposed about said core;
   an insulator interposed betwen said first and second portions of said casing for thermally isolating said core in said portion from said magnet in said first portion;
   said permanent magnet and said core forming a magnetic path;
   means for detecting the temperature of said object, comprising,
   means for applying a pulse voltage to a first terminal of said coil to saturate magnetically said core, and
   means coupled to a second terminal of said coil for producing a temperature output signal indicative of the temperature of said object based on the time between application of said pulse voltage and saturation of said core.

2. A temperature sensor according to claim 1, wherein said core of magnetically soft material and said permanent magnet each define respective longitudinal axes, said core and said magnet separated from each other by said insulator with the axes thereof arranged in parallel.

3. A temperature sensor according to claim 1, wherein said detecting means comprises:
   constant current means coupled to said second terminal of said coil for producing a constant current through said coil upon application of said pulse voltage to said first terminal of said coil.

* * * * *

UNITED STATES PATENT AND TRADEMARK OFFICE
CERTIFICATE OF CORRECTION

PATENT NO. : 4,357,114

DATED : November 2, 1982

INVENTOR(S) : SHINICHIRO IWASAKI

It is certified that error appears in the above-identified patent and that said Letters Patent are hereby corrected as shown below:

Column 4, line 63, delete "references" and substitute --reference--.

Column 5, lines 1 and 2, delete "displaced" and substitute --disposed--.

Column 5, line 41, after "change in" insert --the--.

Signed and Sealed this

Third Day of May 1983

[SEAL]

Attest:

GERALD J. MOSSINGHOFF

Attesting Officer   Commissioner of Patents and Trademarks